United States Patent [19]

Rowland

[11] 4,244,683
[45] Jan. 13, 1981

[54] APPARATUS FOR COMPRESSION MOLDING OF RETROREFLECTIVE SHEETING

[75] Inventor: William P. Rowland, Southington, Conn.

[73] Assignee: Reflexite Corporation, New Britain, Conn.

[21] Appl. No.: 77,488

[22] Filed: Sep. 20, 1979

[51] Int. Cl.³ .................. B29C 17/00; B29C 3/02; B29D 11/00
[52] U.S. Cl. .................................. 425/143; 264/1; 264/284; 425/193; 425/335; 425/385; 425/411
[58] Field of Search ............. 425/89, 143, 193, 335, 425/339, 384, 385, 411, 808; 264/1, 284

[56] References Cited

U.S. PATENT DOCUMENTS

| | | | |
|---|---|---|---|
| 1,671,086 | 5/1928 | Stimson | 350/103 |
| 2,232,551 | 2/1941 | Merton | 264/1 |
| 2,310,790 | 2/1943 | Jungersen | 350/109 |
| 2,313,489 | 3/1943 | Latrobe | 264/1 |
| 2,380,477 | 7/1945 | Jungersen | 526/91 |
| 2,464,738 | 3/1949 | White | 264/1 |
| 2,481,757 | 9/1949 | Jungersen | 350/103 |
| 2,538,638 | 1/1951 | Wilson | 65/305 |
| 2,780,136 | 2/1957 | Erban | 350/120 |
| 2,849,752 | 9/1958 | Leary | 425/11 |
| 2,875,543 | 3/1959 | Sylvester et al. | 428/30 |
| 2,882,413 | 4/1959 | Vingerhoets | 250/483 |
| 2,883,705 | 4/1959 | Hartley | 425/339 |
| 3,357,772 | 12/1967 | Rowland | 350/167 |
| 3,417,959 | 12/1968 | Schultz | 249/117 |
| 3,506,755 | 4/1970 | Rudder et al. | 264/297 |
| 3,541,216 | 11/1970 | Rochlis | 264/293 |
| 3,681,483 | 8/1972 | Moore | 264/1 |
| 3,684,348 | 8/1972 | Rowland | 350/103 |
| 3,689,346 | 9/1972 | Rowland | 156/245 |
| 3,751,550 | 8/1973 | Nauta | 264/275 |
| 3,810,359 | 5/1974 | Rowland | 59/93 |
| 3,811,983 | 5/1974 | Rowland | 156/245 |
| 3,830,682 | 8/1974 | Rowland | 428/142 |
| 3,882,207 | 5/1975 | Hannan et al. | 264/284 |
| 3,935,359 | 1/1976 | Rowland | 59/93 |

FOREIGN PATENT DOCUMENTS

| | | |
|---|---|---|
| 60837 | 4/1943 | Denmark. |
| 735057 | 11/1932 | France. |
| 693647 | 7/1953 | United Kingdom ............. 425/384 |

*Primary Examiner*—James B. Lowe

[57] ABSTRACT

There are disclosed an apparatus and a method for continuously embossing synthetic plastic sheet material with precisely formed embossments in patterns repeating along the length thereof. The apparatus includes a movable polished belt upon which the sheet material is carried, and a series of molds are placed on the sheet material. As the sheet material and molds are advanced in steps through the apparatus, presses clamp the molds and belt against opposite surfaces of the sheet material and raise the temperature of the assembly to embossing temperature for the resin to cause the resin to flow into the mold cavities, and volatiles at the interface are dissolved in the resin. After the embossing step, the clamping pressure is released and this permits limited shrinkage of the mold and sheet material. At subsequent stations, controlled temperature reduction is effected, and limited shrinkage is permitted after the clamping pressure is released at each station and as the material and molds move to the next station. Mold distortion is thus avoided and the embossments remain precisely formed.

16 Claims, 9 Drawing Figures

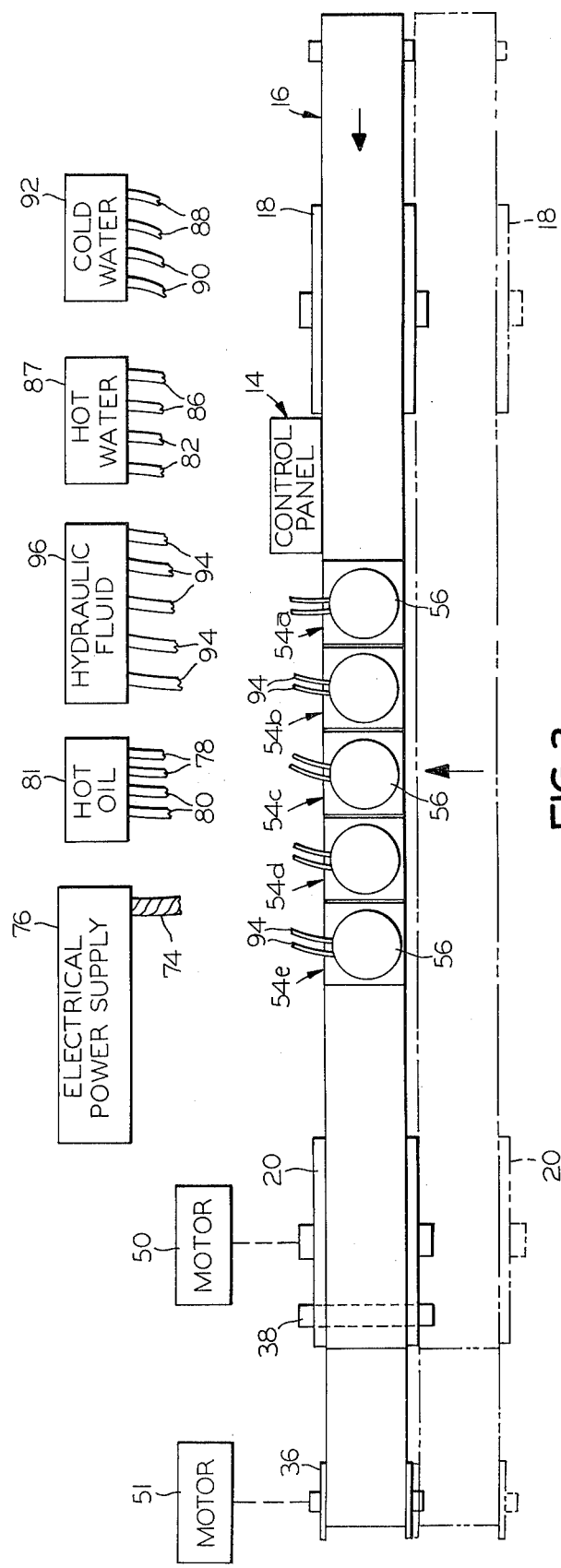
FIG. 3
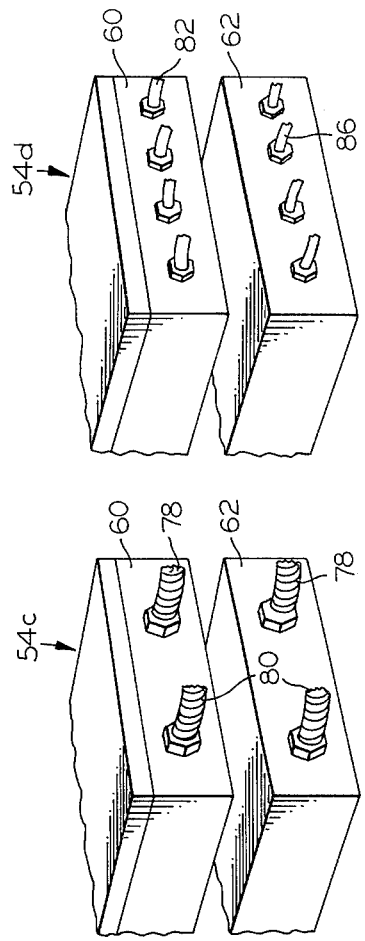
FIG. 6
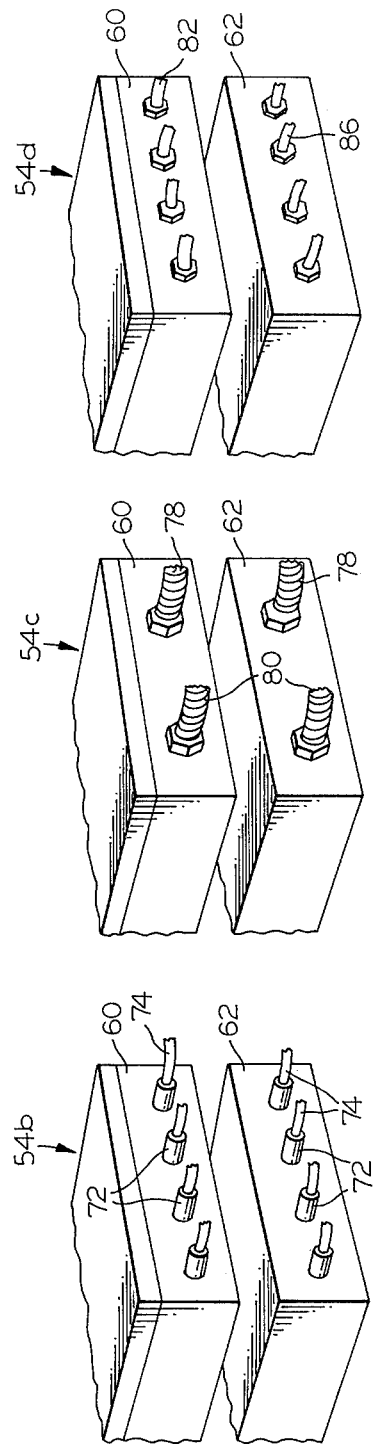
FIG. 5
FIG. 4

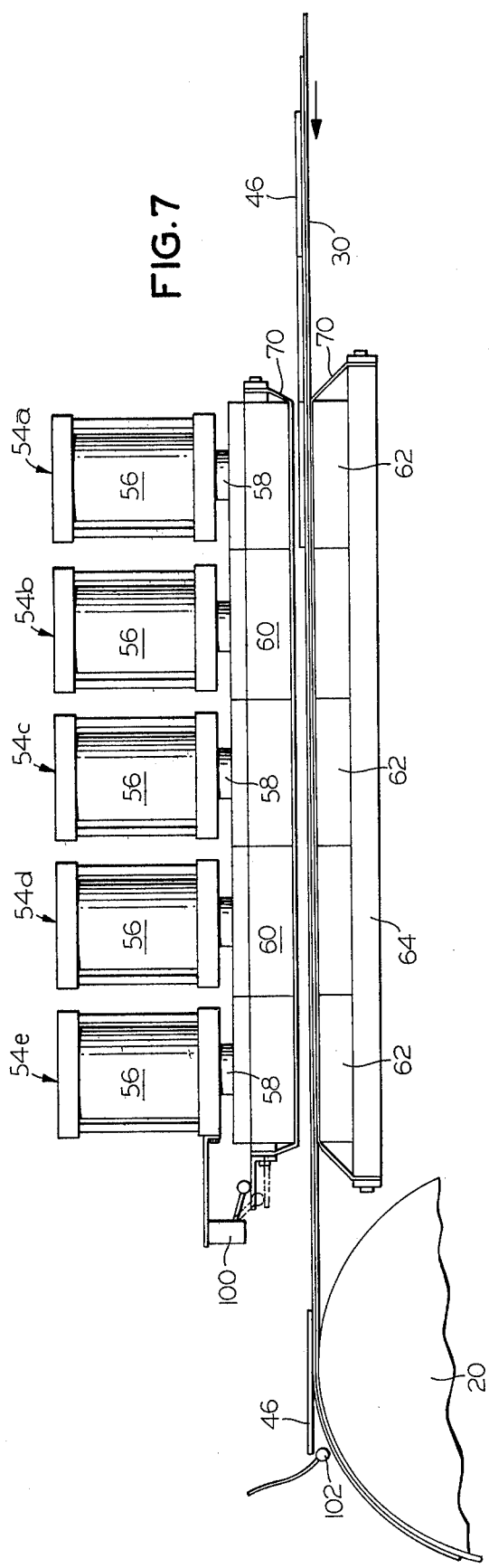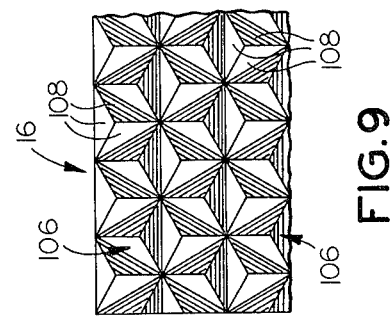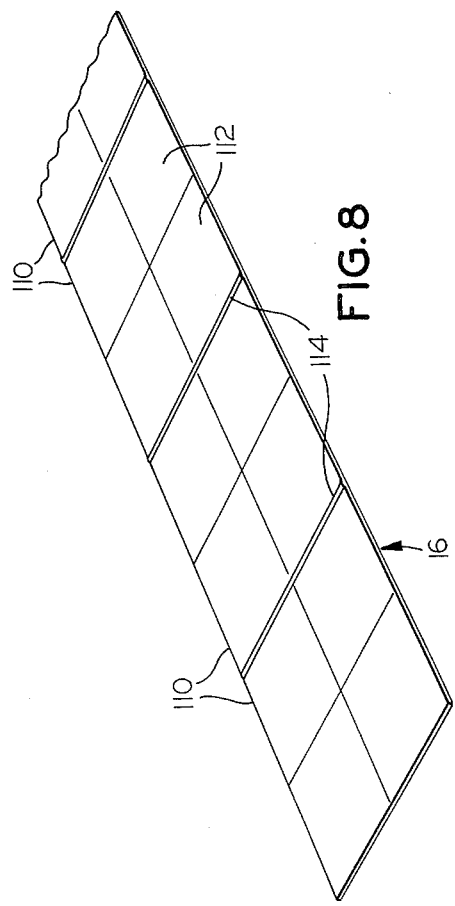

APPARATUS FOR COMPRESSION MOLDING OF RETROREFLECTIVE SHEETING

BACKGROUND OF THE INVENTION

Over the years, many processes and many different types of apparatus have been developed for the embossing of synthetic thermoplastic sheet material. When continuous embossing operations are employed, generally embossing rolls are engraved with the desired embossing pattern and the sheet material is passed through a nip defined by the embossing roll and a cooperating roll. In some instances, embossing belts formed with an embossing pattern have been suggested and in other instances it has been suggested that the sheet material be step-fed through an embossing press with the material elevated to embossing temperature and then cooled in the press while clamping pressure is maintained.

One of the problems inherent in embossing sheet material is to ensure that air or other gases do not become trapped in the cavities of the embossing mold so as to affect the quality of the embossed formations produced therein. Another problem inherent in embossing operations is that of avoiding deleterious effects upon the embossing mold because of the different coefficients of expansion of the metal mold and the plastic sheet material as the embossed sheet material begins to cool in place within the mold while still adhering to the embossing surface thereof. However, if the sheet material is not adequately held in precise contact with the embossing surface of the mold as it cools, there is a tendency for the embossed formations to distort or imperfectly form, and premature stripping of the embossed material from the molds may also adversely affect the quality of the formations.

These problems become of particular significance when microprism type retroreflective sheeting is sought to be produced in a continuous manner. Such microprism sheeting utilizing a highly controlled cube corner formation has heretofore been made by a molding or casting process as described and claimed in Rowland U.S. Pat. Nos. 3,684,348 granted Aug. 15, 1972 and 3,810,804 granted May 14, 1974. Variations of this technology are described and claimed in Rowland U.S. Pat. Nos. 3,689,346 granted Sept. 5, 1972 and 3,935,359 granted Jan. 27, 1976.

It has been previously proposed to emboss cube corner sheeting on a continuous basis as indicated in Jungersen U.S. Pat. Nos. 2,310,790 granted Feb. 9, 1943; 2,380,447, granted July 31, 1945; and 2,481,757 granted Sept. 13, 1949. However, the process and apparatus described therein have not proven satisfactory for generating microprism reflective sheeting.

Illustrative of other processes for molding or casting cube corner reflectors are Wilson U.S. Pat. No. 2,538,638 granted Jan. 16, 1951; Schultz U.S. Pat. No. 3,417,959 granted Dec. 24, 1968; and Swarovski Danish Pat. No. 60,837 published Apr. 19, 1943.

Such cube corner reflectors have been extensively molded from glass and from acrylic resins and are widely employed as safety devices on bicycles, automobiles and other vehicles, as well as for various other retroreflective safety purposes. Although Jungersen suggests that the cube corner formation might be of small dimension, efforts to fabricate microprism formations by conventional embossing techniques have been generally unsatisfactory because it is important that the size and angle of the prism be controlled to a very close tolerance since even a minute deviation will produce a substantial deviation in the capability of the material to retroreflect light rays impinging thereon.

Although conceivably conventional molding or embossing techniques could be employed wherein the sheet material were heated to a temperature sufficient to cause the plastic material to flow into the mold and were held under pressure for a period of time sufficient to permit escape of any air or other gases that might interfere with formation of the embossment and then to permit both mold and sheet material to cool to a temperature wherein the embossed sheet material might be stripped therefrom without injuring the embossments, generally such apparatus and procedures would not adapt themselves to formation of continuous sheeting except by a step process operated at relatively slow speeds.

It is an object of the present invention to provide a novel embossing apparatus which is operable at relatively high speeds to semicontinuously emboss synthetic plastic sheet material with precisely formed embossments along the length thereof in a repeating pattern with substantially no deviation between the embossments of different repeats of the pattern within the series.

It is also an object to provide such apparatus which is relatively rugged in construction, relatively foolproof in operation and readily adaptable to producing different embossing formations.

Another object is to provide a method for producing precisely formed embossments upon synthetic plastic sheet material on a semicontinuous basis at a reasonably rapid rate.

Still another object is to provide such a method which enables close control of the formation of the embossments and substantial elimination of any deviation between the embossed formations of different repeats of the pattern in the series along the length thereof.

A further object is to provide synthetic thermoplastic sheet material in continuous roll form having precisely formed embossments along the entire length thereof with substantially no deviation between the embossments in repeats of the patterns along the length thereof.

SUMMARY OF THE INVENTION

It has now been found that the foregoing and related objects may be readily attained in apparatus for continuously embossing synthetic thermoplastic sheeting which includes a frame and an elongated member mounted for movement in a path along the frame. A series of at least three presses is mounted on the frame along the path with each press having a first platen in spaced relationship to the upper surface of the elongated member and a second platen disposed in spaced relationship to the other surface of the elongated member. The presses are equally spaced, center-to-center, a predetermined distance along the path, and are operable to move at least one of the platens towards the other to a closed position and away from the other to an open position. Indexing means is provided for indexing the elongated member along the path a distance equal to the predetermined distance of spacing of the presses. Press operating means is provided for operating all of the presses functions to open and close the platens, respectively, prior to, and subsequent to, the indexing. Temperature controlling means is connected to the presses for controlling the temperature of at least one of the platens of at least some of the presses along the path.

A multiplicity of mold members overlies the elongated member, and the mold members are adapted to emboss synthetic plastic sheet material disposed therebetween. The molds have an embossing surface defining a multiplicity of closely spaced cavities of microprism cross section.

Preferably, the first of the three presses along the path has the temperature controlling means connected thereto to heat the synthetic plastic material to a predetermined temperature for embossing. The second press has temperature controlling means connected thereto to effect controlled reduction of the temperature of the molds and thereby the synthetic plastic material. The third press along the path has temperature controlling means connected thereto to cool the molds and thereby the synthetic plastic material to a predetermined temperature lower than that effected by the second press. Desirably, the series of presses comprises a series of five presses, and the temperature controlling means connected to the first of the series of five presses along the path preheats the associated molds and synthetic plastic material to a predetermined temperature. The temperature controlling means connected to the second press has temperature controlling means connected thereto to effect heating of the molds and thereby the synthetic plastic material to embossing temperature, and the temperature controlling means connected to the third, fourth and fifth presses effects gradual cooling of the molds and of the synthetic plastic material as they advance along the path.

Preferably, the upper surface of the elongated member is polished to provide a polished surface on the associated sheet material, and the elongated member is an endless belt rotatable through the path.

Preferably, in each of the presses, the upper platen is movably mounted and the second platen is fixedly supported in the frame, with the platens clamping the elongated member and the molds and sheet material therebetween upon closing thereof. Desirably included is control means operatively connected to the indexing means and press operating means to effect the operation thereof.

In the method for embossing synthetic plastic sheet material to generate precisely formed embossments on one surface thereof, an elongated strip of synthetic thermoplastic sheet material is disposed on an elongated member movable in a path providing a series of stations therealong. A series of embossing molds having the desired embossing pattern in their adjacent surfaces is placed on the other surface of the synthetic plastic sheet material so that the molds are closely spaced along the length of the sheet material. A clamping force is applied to the first of the series of molds and the elongated member at the first of the series of stations to deform the sheet material therebetween and cause the synthetic plastic thereof to flow into the embossing pattern of the mold to effect embossment thereof.

The clamping force is released on the first of the series of molds and elongated member at the first station, and the first mold and the cooperating portions of the elongated member and sheet material are advanced to the next station while a second mold is advanced to the first station. A clamping force is applied to the first mold and elongated member at the second station while a clamping force is simultaneously applied to the second mold and the elongated member at the first station to effect embossment of the sheet material thereat. The clamping force is released at the first and second stations, and the first and second molds and the cooperating portions of the elongated member and sheet material are advanced to the next stations while a third mold is advanced into registry with the first station. A clamping force is applied to the molds and elongated member at each of the stations. The foregoing series of steps is repeated to advance the molds, elongated member and sheet material through the series of stations.

The temperature of the molds is controlled at at least some of the stations so that the synthetic resin of the sheet material is readily deformed into the embossing pattern of the mold at the first station and is cooled in its mold in subsequent stations. Finally, the embossed sheet material is stripped from the molds and elongated member after it has advanced through the series of stations.

Desirably, the synthetic resin of the sheet material is a thermoplastic resin which is substantially free from solvents and materials volatile at the embossing temperature. The elongated member has a polished surface and provides a polished opposite surface on the embossed sheet material, and the embossing pattern of the molds provides microprism cavities so that the embossed sheet material has closely spaced microprism formations thereon.

In controlling the temperature of the molds, the sheet material is heated to a semifluid condition for embossing in the first station(s) of the series of stations, and the sheet material is cooled to a temperature below its heat distortion temperature in the stations subsequent to the embossing thereof. The method also may include the step of removing the molds from the elongated member and the sheet material subsequent to passage through the series of stations and returning them to a point prior to the first of the series of stations for repetition of the several steps.

The resultant elongated strip of embossed synthetic resin sheet material has a series of closely spaced repeating patterns of precisely formed embossments on one surface along substantially the entire length thereof, and the deviation in the embossments for the first imprint of the pattern in the series on the strip from that of the last repeat of that pattern in the series is less than one percent.

Preferably, the resin is a thermoplastic, and the other surface thereof is highly polished with the embossments being precisely formed microprisms.

BRIEF DESCRIPTION OF THE DRAWINGS

FIG. 3 is a partially diagrammatic plan view of the apparatus of FIG. 1 showing the belt assembly in the open position in phantom line and in the operative position in full line;

FIG. 4 is a fragmentary perspective view of a platen assembly employing electric heating elements;

FIG. 5 is a similar fragmentary perspective view of a platen assembly utilizing oil as a heat exhange fluid;

FIG. 6 is a similar fragmentary perspective view of a platen assembly utilizing water as a heat exchange fluid;

FIG. 7 is a fragmentary, partially diagrammatic front elevational view to an enlarged scale of the press section of the apparatus of FIG. 1;

FIG. 8 is a fragmentary plan view of the embossed surface of a length of the sheet material embossed by the apparatus of FIGS. 1–7; and FIG. 9 is a plan view to a greatly enlarged scale of the embossed surface of the strip showing the microprism embossments.

DETAILED DESCRIPTION OF THE ILLUSTRATED EMBODIMENT

Figure 1:
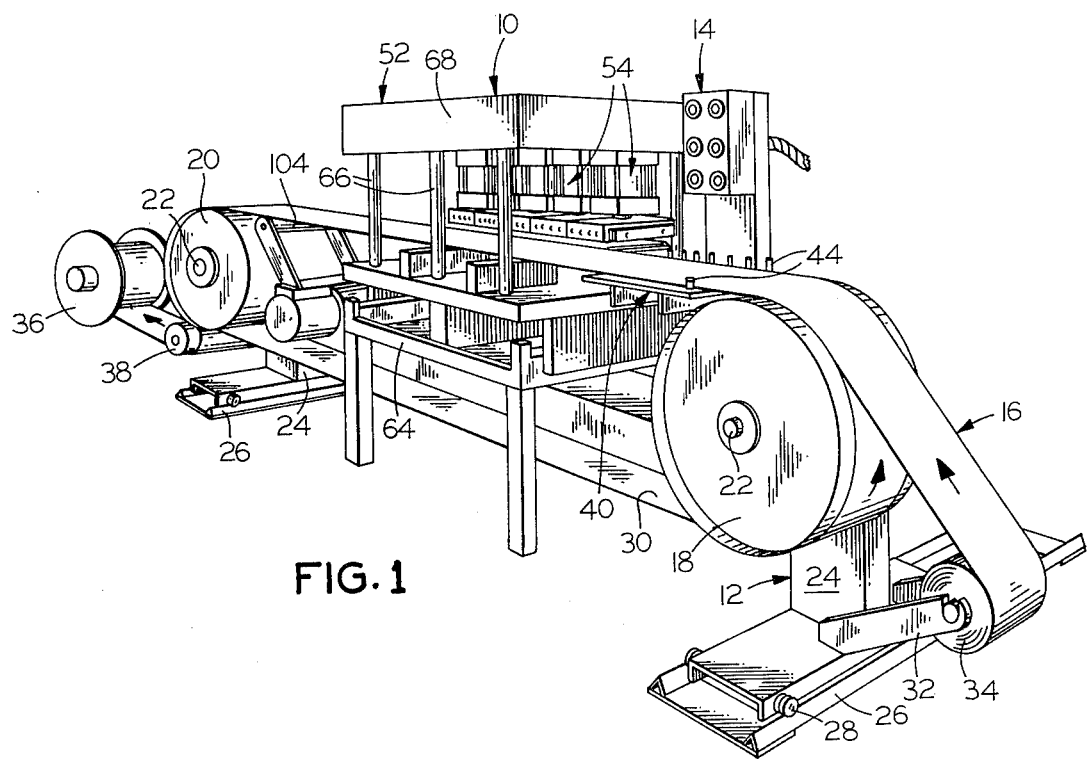
FIG. 1 is a perspective view of embossing apparatus embodying the invention with the belt assembly shown in the open position.

Turning first to FIG. 1, therein illustrated is apparatus embodying the present invention for forming continous strip material embossed upon one surface thereof. The apparatus is comprised of a press assembly generally designated by the numeral 10, a belt assembly generally designated by the numeral 12, and a control assembly generally designated by the numeral 14. It can be seen that sheet material generally designated by the numeral 16 passes through the assembly from the righthand side to the lefthand side as indicated by the arrows.

Turning in detail first to the belt assembly 12, it is generally comprised of the drums 18,20 which are rotatably supported on shafts 22 journaled in the supports 24. The belt assembly 12 is slidably movable on the tracks 26 upon the rollers 28 from the open position shown in FIG. 1 in which the belt assembly is displaced to the left, to an operative position to the right, both as viewed in FIG. 1. (These positions are shown in phantom line and full line, respectively, in FIG. 3.). Extending about the drums 18,20 is a continuous metal polishing member or belt 30 which has a highly polished outer surface. Also part of the belt assembly 12 is the sheet material feed system comprised of the roll support 32 carrying the feed roll 34 of synthetic plastic sheet material 16 to be embossed, the take-off roll 36 at the opposite end of the assembly, and the stripper roll 38.

Figure 2:
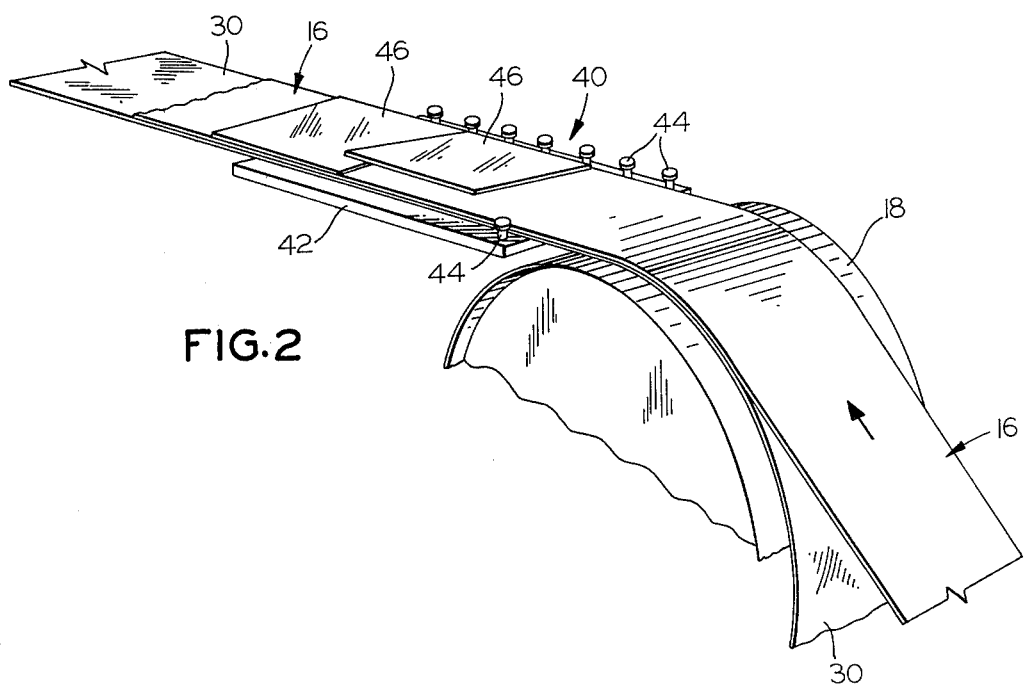
FIG. 2 is a fragmentary perspective view drawing to an enlarged scale of the mold placement station showing one mold in position upon the embossing belt and another being pivoted downwardly into position.

The belt assembly 12 additionally includes the mold placement station generally designated by the numeral 40 which is provided by a plate 42 underlying the belt 30 with the upstanding alignment pins 44 disposed on opposite sides of the embossing member 30. As seen in FIG. 2, a multiplicity of molds 46 is placed upon the upper surface of the sythetic plastic sheet material 16 in end-to-end relationship as the sheet material 16 and embossing member 30 move therethrough.

At the take-off end of the belt assembly are also a drive motor 50 diagrammatically illustraed in FIG. 3 which supplies drive power to the drum 20 and thereby the belt 30, and a drive motor 51 which supplies drive power to the take-off roll 36. Both drive motors are connected to their driven members through suitable clutch assemblies and are provided with brakes to precisely limit the amount of rotation effected thereby.

Turning now to detail to the press assembly 10, it is generally comprised of a frame generally designated by the numeral 52 which includes a horizontal bed 64 and an upper member 68 which are rigidly supported relative to each other by the reinforcing columns 66. Disposed within the frame 52 are a series of five presses generally designated by the numeral 54 and each comprised of a cylinder 56 carried by the upper member 68, a piston 58 movable therein, an upper platen 60 movably supported by the piston 58 and a lower platen 62 rigidly supported upon the bed 64.

As seen in FIG. 7, cushion members 70 extend over the faces of the platens 60,62 to protect the belt 30 and molds 46 from injury and prevent the flow of resin into contact with the surfaces of the platens 60,62. These cushion members 70 are conveniently comprises of a composite of a fiberglass fabric facing coated with polytetrafluoroethylene resin and a backing of silicone rubber.

As seen in FIGS. 3 and 4, the press 54b uses platens 60,62 which are heated by electric cartridge heaters 72 which are connected to the electric power supply 76 by the cables 74. The press 54a similarly uses such electric cartridge heaters.

As seen in FIGS. 3 and 5, the press 54c uses platens 60,62 which are controlled in temperature by hot oil which flows therethough from the hot oil supply 81. Inlet hoses 78 and outlet hoses 80 provide the connection therebetween.

As seen in FIGS. 3 and 6, the press 54d uses platens 60,62 which are controlled in temperature by the passage of hot water from the hot water supply 87 through the inlet hoses 82 and outlet hoses 86. The press 54e uses platens which are cooled by water at ambient temperature from the cold water supply 92 passing through the inlet hoses 88 and outlet hoses 90.

The several cylinders 56 are connected to a hydraulic fluid pump or reservoir under pressure 96 by inlet and outlet hoses 94. Control of the pump 96 will effect movement of the pistons 58 upwardly and downwardly and thus open and close the platens 60,62.

The control assembly 14 contains the necessary switching mechanisms to effect operation of the hydraulic pump 96, and the motors 50, 51 and the action of the heat exchange mechanisms for the platens 60,62 of the several presses. As seen in FIG. 7, a limit switch 100 is provided on the frame 52 and senses when the upper platens 60 have been moved to the open position as indicated in full line from the closed position shown in phantom line . A mold sensor 102 detects the reflection of light from the bottom surface of an advancing mold 46 to terminate advance of the embossing belt 30. In FIG. 1, there is shown a control roll member 104 which rotates as the belt 30 passes thereover and which operates a switch (not shown) to terminate the advance of the belt 30 after sensing rotation equivalent to a lineal distance equal to the length of a mold 46.

Turning now to FIG. 9, therein illustrated is embossed microprism sheeting of the type described in the aforementioned Rowland U.S. Pat. No. 3,684,348 and produced in accordance with the present invention. The cube corner embossments or prisms generally designated by the numeral 106 have three triangular faces 108 and are essentially perfectly conformed to the precisely formed embossing cavities of the mold 46. In FIG. 8, there is illustrated a length of the embossed sheeting produced by the apparatus and method of the present invention with a series of embossed patterns 110 repeating along its length. In the illustration, each pattern 110 is provided by the impression of a single mole 46, and each mold pattern 110 is provided by four square sections 112. The several patterns 110 are separated by a relatively thin marginal portion 114 extending transversely of the sheet material strip representing the area of abutment of adjacent molds.

Turning now to the operation of the apparatus, the belt assembly 12 is in the open position shown in FIG. 1 and in phantom line in FIG. 3 wherein the belt 30 and sheet material 16 are disposed outwardly of the press assembly 10 by movement to the open position on the tracks 26. In this position, the belt 12 and sheet material 16 are not exposed to the heating action of the presses 54 while initial preparations are being made to commence operation of the apparatus.

The operator feeds an end of the sheet material 16 from the feed roll 34 along the belt 30 and through the nip between the drum 20 and the stripper roll 38 and onto the take-off roll 36. A first mold 46 is placed upon the sheet material 16 in lateral alignment with the first press 54a, and additional molds are then placed in edge-to-edge contact until the molds 46 reach and fill the mold station 40. Thus, the apparatus is ready to commence operation with a mold in position at the first station.

Concurrently, the control assembly 14 is actuated to begin operation of the several heat control means operating upon the several platens 60,62 of the presses 54 to bring them to the desired temperature. When desired temperature levels have been reached in the several platens 60,62, the apparatus is ready to begin operation, and the belt assembly 12 is moved on the tracks 26 into its operative position shown in full line in FIG. 3 in vertical alignment with the presses 54 of the press assembly, thus bringing the first mold 46 into vertical aligment with the first press 54a.

The operator then actuates the start switch (not shown) of the control assembly 14 which actuates the hydraulic pump 96 to supply hydraulic fluid to the cylinders 56 of the several presses 54 and move the upper platens 60 downwardly to clamp the first mold 46, belt 30 and sheet material 16. After a predetermined period of time to effect the desired level of heat transfer to mold 46, belt 30 and sheet material 16, the control assembly 14 actuates the hydraulic pump 96 to cause the cylinders 56 to raise the upper platens 60 and release the clamping pressure.

The limit switch 100 senses the termination of upward movement and the control assembly 14 then actuates the motor 50 to rotate the shaft 22 and drum 20 to advance the belt 30, molds 46 and sheet material 16 a predetermined lineal distance equal to the center-to-center spacing of the molds 46 and presses 54. Simultaneously, the motor 51 is actuated to rotate the take-off roll 36 to wind the advancing sheet material 16 thereon. The control roll 104 rotates concurrently with the advancing belt 30 and operates a switch (not shown) when the desired amount of lineal movement has occured to terminate operation of the motors 50, 51 and to actuate the pump 96 to operate the cylinders 56 to move the upper platens 60 into clamping engagement. At this point the second mold 46 in the series is aligned with the first press 54a and the first mold 46 in the series has moved into alignment with the second press 54b. The operator places an additional mold 46 upon the sheet material 16 at the mold station 40.

This sequence of operations continues as the molds 46, sheet material 16 and belt 30 advance through the several stations provided by the series of presses 54. After the first mold 46 in the series exits from the press assembly 10, it continues to move with the belt 30 and sheet material 16 to the drum 20 and additional cooling takes place as there is exposure to ambient air. As the flexible sheet material 16 and belt 30 curve about the drum 20, the rigid mold 46 continues in a horizontal path and the sheet material 16 is stripped therefrom. At this point, the mold 46 is removed and returned to the operator at the mold station 40 for reuse, although it may proceed through an intermediate inspection and/or cleaning operation if so desired.

As seen in FIG. 7, a mold sensor 102 is provided on the downstream end of the lineal path of the molds 46 as they pass in a lineal path over the drum 20. If the bottom surface of the molds 46 is reflective, this sensor 102 may sense the reflection of a light beam therefrom to terminate the operation of the motor 50 and thereby the movement of the belt 30. Alternatively, the sensor 102 may be a limit switch in the lineal path of the molds 46 which is operated as the mold 46 advances.

It will be appreciated that the sheet material at the first press is being raised to a temperature approaching that required for the embossing operation, and, in fact, some limited embossing may take place at this station depending upon the resin and the temperatures employed. In the second press, the sheet material 16 is elevated to a temperature at which it is sufficiently fluid under the clamping pressures to flow into full conformity with the embossing cavities of the mold 46 and the pressure is maintained for a period of time to allow any air or volatiles at the interface to dissolve in the resin (and to escape from the edges of the mold 46 if bleed grooves are employed). At this point, the hot resin adheres to the surface of the mold 46 and the belt 30.

When the clamping pressure is released, the assembly of belt 30, mold 46 and sheet material 16 is adhesively bonded by the hot resin and is advanced to the third station. During the period of time that the clamping pressure is released, limited shrinkage of the mold 46 and sheet material 16 (and belt 30) takes place to relieve some of the stresses generated by the differential coefficients of thermal expansion of the resin and metals. At the third station, the clamping pressure is restored and the temperature of the assembly is reduced a predetermined amount by reason of the heat exchange control effected with respect to the platens 60,62, thus introducing new stresses in the mold 46. Upon release of the clamping pressure, limited shrinkage again occurs to relieve these stresses.

This process continues through the additional stations as the sheet material 16 is cooled to a temperature below its heat distortion temperature sufficient to permit it to be stripped from the mold 46 without adverse effect upon the embossments. During the entire series of operations, the sheet material 16 remains adhered to the surface of the cavities in the mold 46 and to the surface of the belt 30 so as to ensure its conformity with the embossing pattern on one surface and its surface conformity with the belt 30 (usually highly polished). By the time the assembly has reached the drum 20, the temperature of the sheet material is such that the sheet material 16 may be readily stripped from the molds 46 as it curves away therefrom. As the sheet material 16 passes about the stripper roll 38, it is readily stripped from the surface of the belt 30 and is wound onto the take-off roll 36.

It will be appreciated that the process of placing the molds upon the sheet material at the mold station 40 and of removing the molds 46 from the sheet material 16 at the downstream end may be automated if so desired. Moreover, other methods for controlling the advance of the assembly through the several stations may be substituted as may be other means for effecting the desired level of heat exchange. However, this assembly has proven highly reliable and relatively trouble-free in operation.

The theory of operation of the method of the present invention is not fully understood. However, it is believed that the use of the high temperatures and pressures at the embossing station for a controlled period of time permits air and other volatiles at the interface to dissolve within the relatively fluid resin so that it will not prevent flow of the resin into full conformity with the embossing cavities. By limiting the time that the sheet material, mold and belt are clamped together at any one station and releasing the clamping pressure and providing controlled stepwise cooling of the sheet material following embossment, the molds (and the sheet material) shrink only the amount controlled by the temperaure differential between presses to relieve the stresses being generated by the differential shrinkage of the resin and metal. So long as the shrinkage is less than the elastic limit of the mold material, no harm is done to the molds, and, therefore, the repeated cycling does not effect distortion. Moreover, the sheet material adheres to the surface of the embossing cavities of the molds to the polishing belt as it moves through the several stations and cools with the molds so that it remains in full conformity therewith to avoid distortion of the embossments.

The process and apparatus of the present invention are adaptable to use with various resins which are sufficiently fluid at elevated temperatures to permit the desired embossment of the sheet material and which are not so adhesive in character as to so strongly adhere to the mold and prevent stripping therefrom. Although heat-curable thermosetting resins such as B-stage polyesters and acrylics may be employed, the preferred resins are thermoplastics such as polycarbonates, polyacrylates and rubber-modified polyacrylates, polysyrenes and rubber-modified polystyrenes, acrylonitrile-/butadiene/styrene interpolymers (ABS), linear polyethylene, etc. The resins should not contain solvents or other volatile components which will be evolved during the embossing operation although some small amounts of volatiles inherently dissolved or present therein may be accomodated.

The sheet material may vary widely in thickness depending upon the depth of embossing desired since it must provide sufficient resin to flow into the molds and maintain integrity of the resultant web. The thickness will also depend upon the length of the embossing cycle that may be accommodated because of the necessity to effect heat transfer between the platens, mold, belt and the sheet material. Thus, the thickness may vary from as little as 0.003 inch to as much as 0.050 inch and even more if so desired.

The embossing cavities and the resultant embossments may have any desired configuration. The cavities are preferably discrete to minimize flow of air or volatile components into any appreciable concentration in one area of the mold surface; alternatively or additionally, shallow bleed grooves may be formed in the mold surface about its periphery to permit gases to escape. By providing closely spaced cavities, flow and dissolution of air and volatiles is enhanced. The process has proven particularly effective in the formation of microembossments having a vertical height or depth of not more than about 0.015 inch and preferably less than 0.008 inch. Exemplary of discrete microembossments are the microprisms described in the aforementioned Rowland U.S. Pat. No. 3,684,348; and exemplary of elongated microembossments are lenticular ribs of the type used to produce Fresnel lenses.

The molds may be fabricated from any material providing the desired heat transfer characteristics and ability to withstand repeated heat cycling and clamping pressure including nickel, copper and steel. The embossing surface should be substantially inert to the synthetic resin to avoid interaction therewith; accordingly, the embossing surface may be plated with various metals such as nickel and gold.

The size of the molds may vary widely depending upon the press sizes available for the apparatus. Because of the necessity for maintaining substantially uniform pressure over the entire surface of the molds, a practical upper limit for either the width or the length dimension of the molds is 36 inches, with the preferred molds being those having at least one edge dimension of not more than 12 inches. The molds may have any desired configuration (square or rectangular) depending upon the configuration of the press platens available.

Although release agents may be applied to the surface of the molds to facilitate release of the sheet material therefrom after it exits from the last station, such release agents are generally not desirable in the formation of microprism embossments and may excessively interfere with obtaining the level of adhesion desired between the sheet material and the mold surface (and belt) during the forming and cooling steps.

Although it is possible to effect heat control of the molds directly by coupling heat exchange fluid conduits thereto or by placing heating means therein, it is more simple and more economical to effect heat exchange with the molds and with the embossing belt by heating or cooling the platens of the presses. Moreover, although it is possible to effect the desired level of heat transfer solely through the mold, it is desirable to effect cooling or heating of both upper and lower platens for more rapid and uniform operation.

The temperature to which the molds and thereby the sheet material is heated is dependent upon the particular resin selected since the resin must be sufficiently fluid to permit the flow required to move into the embossing cavities under the pressures employed. Generally this will require a temperature at least 40° F. above the glass transition temperature ($T_g$) of the resin (desirably at least 70° F.) and preferably at the temperature recommended for injection molding of the resin. For example, with polycarbonate resin, a temperature of about 400° F. is desirable for the sheet material.

The subsequent cooling steps should lower the temperature of the resin below its heat distortion temperature, and preferably to a point about 30–70° F. therebelow, but not so low as to permit stresses to develop therein due to the significant difference in coefficients of expansion of the mold material and the resin. For example, with polycarbonate sheeting, the temperature of the last mold should be about 140° F.

The method of effecting temperature control of the platens may vary. Depending upon the desired temperature, electric cartridge heaters, hot oil or heat exchange fluid, hot or cold water, coolant, etc. may be employed. In the first molds of the series used to heat the sheet material to the desired temperature, electric heaters have proven particularly effective.

The number of presses may vary from a minimum of three—one to emboss, and two to cool—to as many as desired, with cost and the amount of heat exchange required being the principal factors. To decrease the time required for each step of the cycle and to provide better control of the cooling and to minimize the development of stresses, it is desirable to employ at least three presses to effect cooling. Although radiant heat and other means may be used to effect heating of the synthetic resin sheet material, mold and belt prior to their passage into the embossing station, it has been found beneficial to precede the embossing station with a press and a station in which the sheet material, mold and belt are heated to a temperature approaching that required for the embossing operation. Depending upon the nature of the resin, some partial embossing of the sheet material may occur in this preliminary station.

Although the bed platens underlying the embossing belt may comprise a single compartmented member divided and insulated to provide the lower platens so as to permit the desired control of temperature at the several stations, the preferred assembly utilizes separate platens for ease of construction, cost and temperature control. Moreover, although the presses may utilize bottom platens which are also movable to effect the clamping engagement, it has been found satisfactory to move only the upper platen so long as the bottom platen is spaced closely to the polishing belt.

Exemplary of the operation of the apparatus and method of the present invention is the following specific example.

EXAMPLE ONE

Apparatus substantially as illustrated in the attached drawings utilizes hydraulic cylinders providing 15 tons pressure to generate about 300–400 psi across the face of square molds having an edge dimension of 9 inches and comprising gold plated nickel molds having microprism embossing cavities which are 0.006 inch on center and 0.0026 inch in depth to provide an embossed pattern seen in FIG. 9.

The platens of the first press are heated by electric cartridge heaters to a temperature of about 400°–450° F.; and the platens of the second or embossing press are heated by cartridge heaters to a temperature of about 500°–550° F. The platens of the third press are temperature controlled by flow therethrough of oil heated to a temperature of 320°–350° F.; and the platens of the fourth press are temperature controlled by the flow of water therethrough heated to about 185°–195° F. The platens of the last press are cooled by water at ambient temperature. As a result, mold temperatures of about 400°, 450°, 340°, 240° and 140° F. are obtained at the several stations.

The embossing belt comprises polished stainless steel of about 9.150 inches in width and 0.020 inch in thickness, and the sheet material has a thickness of 0.010 inch and is comprised of polycarbonate resin. The sheet material is clamped at each station for a period of about 15 seconds and the time to transfer the mold, sheet material and belt to the next station is about 3.2 seconds.

Upon inspection, the finished material comprises an elongated roll of the polycarbonate sheet material having one polished surface and, on its other surface, a repeating pattern of the microprism embossments which is free from imperfections in repeats of the embossing pattern along its length although the margins of the molds are evident. Examination of the microprisms themselves indicates that there is less than about 0.5 percent deviation in any dimension of the microprisms of the same mold pattern as it repeats along the length of the sheet material. The molds are found to be free from distortion as is the belt.

Thus, it can be seen from the foregoing detailed specification and drawings that the apparatus and method of the present invention provide a highly facile and relatively economical method for producing continuous embossed synthetic resin sheeting wherein the embossments are precisely formed. The apparatus is rugged, adaptable to use with various resins and relatively simple to operate and control. The resultant sheet material has a repeating pattern of embossments which are highly uniform in configuration and dimension in the repeats of the pattern produced by a given mold, and the molds enjoy a relatively long life.

Having thus described the invention, I claim:

1. In apparatus for continuously embossing synthetic thermoplastic sheeting to generate precisely formed embossments on one surface thereof, the combination comprising:
   A. a frame;
   B. an elongated member mounted for movement in a path along said frame;
   C. a series of at least three presses mounted on said frame along said path, each press having a first platen in spaced relationship to the upper surface of said elongated member and a second platen disposed in spaced relationship to the other surface of said elongated member, said presses being equally spaced, center-to-center, a predetermined distance along said path, said presses being operable to move at least one of said platens towards the other to a closed position and away from the other to an open position;
   D. means for indexing said elongated member along said path a distance equal to said predetermined distance of spacing of said presses;
   E. means for operating all of said presses to open and close said platens, respectively, prior to, and subsequent to said indexing; and
   F. means connected to said presses for controlling the temperature of at least one of said platens of at least some of said presses along said path.

2. The embossing apparatus of claim 1 wherein there is included a multiplicity of mold members overlying said elongated member and adapted to emboss synthetic plastic sheet material disposed therebeteen.

3. The embossing apparatus of claim 2 wherein said molds have an embossing surface defining a multiplicity of closely spaced cavities of microprism cross section.

4. The embossing apparatus of claim 1 wherein the first of said three presses along said path has said temperature controlling means connected thereto to heat the associated synthetic plastic material to a predetermined temperature for embossing thereof, wherein the second of said presses along said path has temperature controlling means connected thereto to effect controlled reduction of the temperature of the molds and thereby the synthetic plastic material, and wherein the third press along said path has temperature controlling means connected thereto to cool the molds and thereby the synthetic plastic material to a predetermined temperature lower than that effected by said second press.

5. The embossing apparatus of claim 1 wherein said series of presses comprises a series of five presses.

6. The embossing apparatus of claim 5 wherein said temperature controlling means connected to the first of said series of five presses along said path preheats the associated molds and synthetic plastic material to a predetermined temperature, wherein the temperature controlling means connected to the second of said series of presses has temperature controlling means connected thereto to effect heating of the associated molds and thereby the synthetic plastic material to embossing temperature, and wherein the temperature controlling means connected to the third, fourth and fifth of said series of presses effects gradual cooling of the associated molds and of the synthetic plastic material as they advance along said path.

7. The embossing apparatus of claim 1 wherein said upper surface of said elongated member is polished to provide a polished surface on the associated sheet material.

8. The embossing apparatus of claim 1 wherein said elongated member is an endless belt rotatable through said path.

9. The embossing apparatus of claim 1 wherein, in each of said presses, said upper platen is movably mounted and said second platen is fixedly supported in said frame, said platens clamping said elongated member and the associated molds and sheet material therebetween upon closing thereof.

10. The embossing apparatus of claim 1 wherein there is included control means operatively connected to said indexing means and said press operating means to effect the operation thereof.

11. In apparatus for continuously embossing synthetic thermoplastic sheeting to generate precisely formed embossments on one surface thereof and a smooth opposite surface, the combination comprising:
A. a frame;
B. an elongated polishing member mounted in said frame for movement in a path along said frame and having a highly polished upper surface;
C. a series of mold members overlying the polished surface of said polishing member and adapted to emboss an associated length of synthetic plastic sheet material disposed between said molds and said polishing member, said molds being equally spaced, on center, along said path a predetermined distance;
D. a series of at least three presses mounted in said frame along said path, each press having a first platen in spaced relationship to said polished surface of said polishing member and a second platen disposed in spaced relationship to the other surface of said polishing member, said presses being equally spaced, center-to-center, along said path a distance substantially equal to the spacing of said mold members, said presses being operable to move at least one of said platens towards the other to a closed position and away from the other to an open position, said platens in said closed position clamping the polishing member and molds tightly on opposite surfaces of the associated sheet material to effect embossment thereof; p1 E. means for indexing said polishing member along said path a distance substantially equal to said spacing to advance the associated sheet material and said molds from press to press;
F. means for operating said presses to open said platens to release the clamping force on said polishing member and molds and to close said platens upon completion of the indexing movement to restore said clamping force; and
G. means connected to said presses for controlling the temperature of at least one of said platens of at least some of said presses along said path to effect temperature control of said molds as they are indexed from press to press.

12. The embossing apparatus in accordance with claim 11 wherein said molds have an embossing surface defining a multiplicity of closely spaced cavities of microprism cross section.

13. The embossing apparatus of claim 11 wherein the first of said three presses along said path has said temperature controlling means connected thereto to heat the associated synthetic plastic material to a predetermined temperature for embossing thereof, wherein the second of said presses along said path has temperature controlling means connected thereto to effect controlled reduction of the temperature of the molds and thereby the synthetic plastic material, and wherein the third press along said path has temperature controlling means connected thereto to cool the molds and thereby the synthetic plastic material to a predetermined temperature lower than that effected by said second press.

14. The embossing apparatus of claim 11 wherein said series of presses comprises a series of five presses and wherein said temperature controlling means connected to the first of said series of five presses along said path preheats said molds and the associated synthetic plastic material to a predetermined temperature, wherein the temperature controlling means connected to the second of said series of presses has temperature controlling means connected thereto to effect heating of said molds and thereby the synthetic plastic material to embossing temperature, and wherein the temperature controlling means connected to the third, fourth and fifth of said series of presses effects gradual cooling of said molds and of the synthetic plastic material as they advance along said path.

15. The embossing apparatus of claim 11 wherein said elongated member is an endless belt rotatable through said path.

16. The embossing apparatus of claim 11 wherein, in each of said presses, said upper platen is movably mounted and said second platen is fixedly supported in said frame, said platens clamping said elongated member and said molds and the associated sheet material therebetween upon closing thereof and wherein there is included control means operatively connected to said indexing means and said press operating means to effect the operation thereof.

* * * * *